United States Patent
Hurst et al.

[15] 3,662,105
[45] May 9, 1972

[54] ELECTRICAL SENSOR OF PLANE COORDINATES

[72] Inventors: George S. Hurst; James E. Parks, both of Lexington, Ky.

[73] Assignee: The University of Kentucky Research Foundation, Lexington, Ky.

[22] Filed: May 21, 1970

[21] Appl. No.: 39,353

[52] U.S. Cl. ................................................178/18
[51] Int. Cl. ..............................................H04n 1/00
[58] Field of Search ............178/18, 19, 20; 338/89, 90, 338/91

[56] References Cited

UNITED STATES PATENTS

| | | | |
|---|---|---|---|
| 3,005,050 | 10/1961 | Koenig | 178/20 |
| 3,304,612 | 2/1967 | Proctor et al. | 178/18 |
| 3,308,253 | 3/1967 | Krakinowski | 178/18 |
| 2,938,185 | 5/1960 | Bill | 338/89 |

FOREIGN PATENTS OR APPLICATIONS 1,080,592  4/1960  Germany..................178/20

Primary Examiner—Kathleen H. Claffy
Assistant Examiner—Horst F. Brauner
Attorney—William E. Sherwood

[57] ABSTRACT

An inexpensive electrical sensor of plane coordinates employs juxtaposed sheets of conducting material having electrical equipotential lines extending across each sheet and arranged normal to each other. A probe upon touching each sheet at a selected intersection of the equipotential lines causes separate signals to be applied to one or more conventional information-indicating units.

13 Claims, 6 Drawing Figures

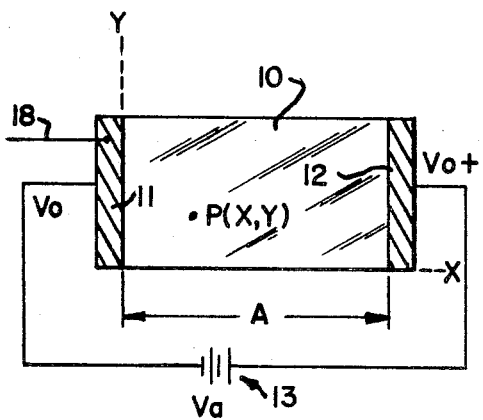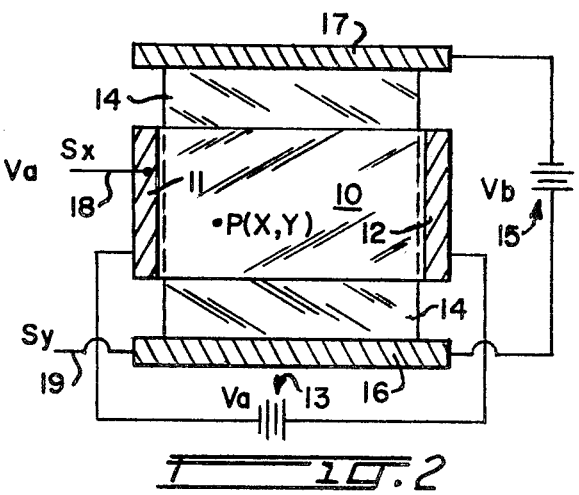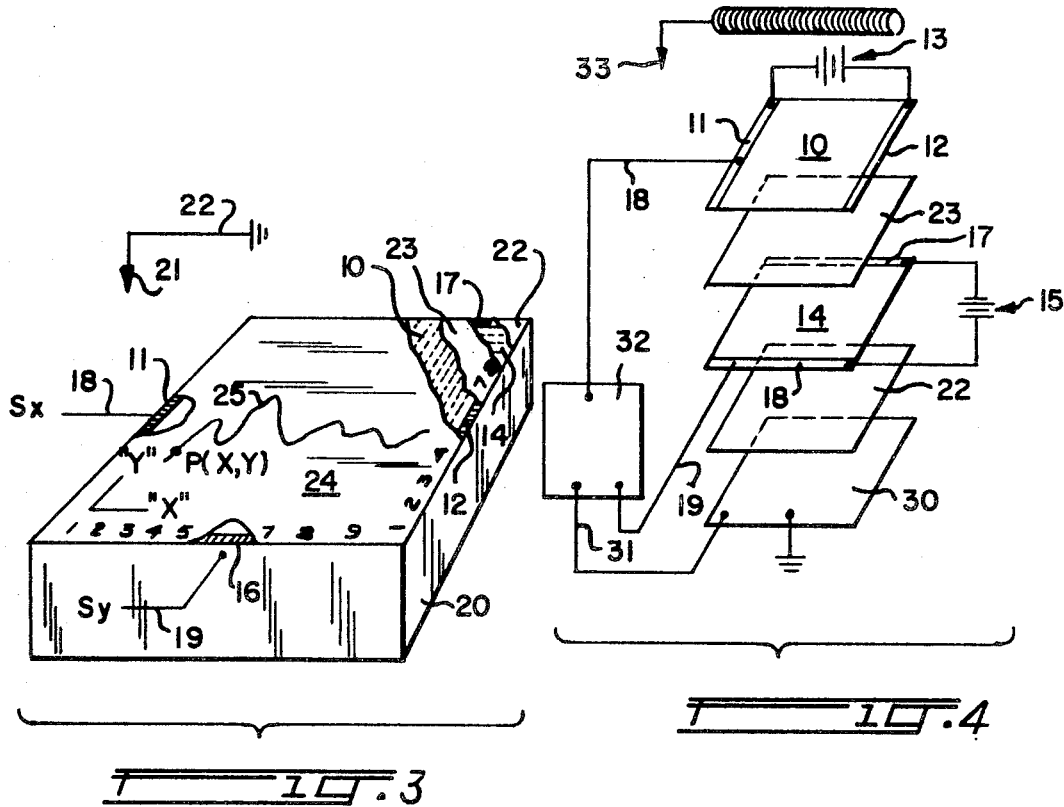

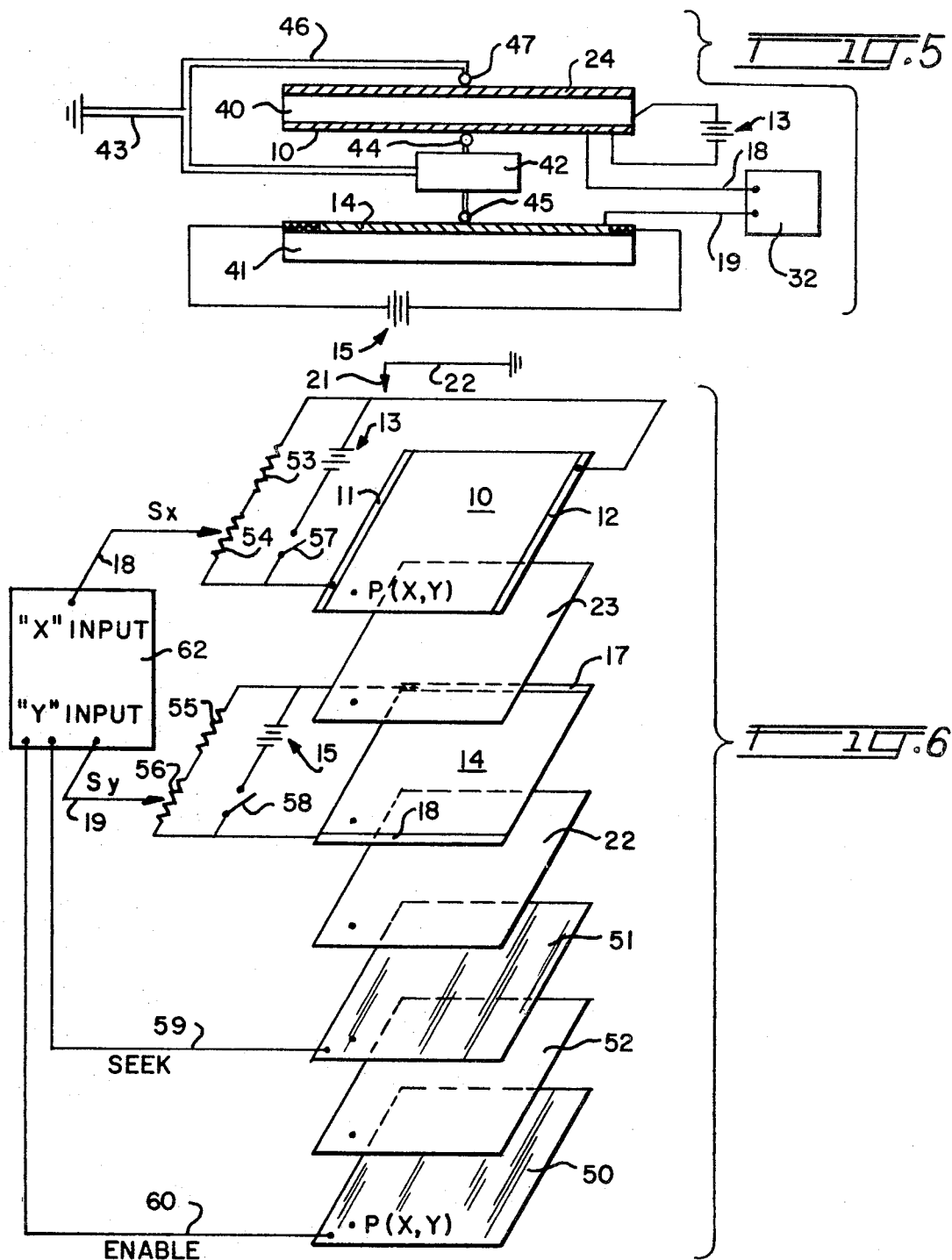

ELECTRICAL SENSOR OF PLANE COORDINATES

BACKGROUND OF THE INVENTION

The electrical sensing of information relating to plane coordinates has heretofore been carried out with many forms of apparatus, but which, so far as we are aware, have been characterized by the use of relatively complex and expensive equipment. As an example of such information, one having a function F $(x,y)$ in graphical form may wish to replot that function with linear or non-linear scale changes; or to divide or multiply the function by another function G $(x,y)$; or to differentiate F $(x,y)$, or to integrate F $(x,y)$; or to read F $(x,y)$, or the operations of dividing, multiplying, integrating or differentiating the same, into a digital computer paper tape, magnetic tape or other memory.

The use of single sheets of conductive material, such as paper or conducting plastics of uniform resistivity suitably activated electrically, over which a probe may be selectively moved in contact with the sheet and through which probe a signal may be transferred to an information-indicating unit, is well known in the techniques of plotting electrical fields.

Likewise, the use of such a single sheet and a probe through which a signal is transmitted is taught in Poland Pat. No. 3,355,692 disclosing a function generator wherein the function F $(x,y)$ is manifested by an electrical potential corresponding to the point at which the probe touches the single sheet and with the probe being moved by servomotors.

Moreover, in Peek U.S. Pat. No. 2,907,824 an electrographic transmitter is shown in which a magnetic stylus manually movable over juxtaposed electrically charged separate windings causes the windings to touch each other and to transmit signals therefrom which correspond to the $x$ and the $y$ coordinates of these windings at the point of such stylus touching. However, in this arrangement the physical movement of the loose winding toward the tight winding under the influence of the magnetic stylus requires elaborate insulation details and careful spacing of many wires per inch to achieve resolution. These, of course, contribute to the high cost of the apparatus.

In contrast, therefore, with such conventional apparatus as above mentioned the present invention employs inexpensive sheets of insulation and of conducting material, together with a simple electrical circuit and a simple probe.

SUMMARY

The invention employs the combination of a pair of conductive sheets having a uniform restivity throughout and with these sheets being insulated from each other and juxtaposed so that equipotential lines extending across the respective sheets or orthogonal to each other. Each sheet is an element of a simple electrical circuit and these circuits are floating with respect to each other and with respect to ground. Each sheet has extending therefrom an individual conductor, adapted to be connected to an information-indicating unit and through which conductors separate signals may be carried between the sheets and the unit when the sheets are touched by a movable probe.

Among the objects of the invention are the provision of a simple electrical sensor of plane coordinates using inexpensive materials and simple electrical circuitry; the provision of a sensing apparatus which may be readily assembled or disassembled; this provision of a sensing apparatus which may be readily modified by the addition of inexpensive metallic sheets and insulating sheets to adapt the same to use with different types of information-indicating units; and the provision of a sensing apparatus adapted for use with a variety of movable probes.

These and other advantages and objectives of the invention will become more apparent as the description proceeds and when considered in conjunction with the accompanying drawings in which:

FIG. 1 is a schematic diagram illustrating potential relations with respect to a single sheet of conductive material as employed with the invention.

FIG. 2 is a schematic view of two cooperating sheets of conductive material employed with the invention.

FIG. 3 is a perspective and partially broken-away view of a supporting member on which a stack of readily removable sheets are mounted for carrying out the sensing operation, and illustrating the simplicity of the apparatus.

FIG. 4 is a diagrammatic view illustrating an arrangement of sheets in a second form of apparatus.

FIG. 5 is a diagrammatic view illustrating a sheet arrangement with a modified form of probe in a third form of apparatus and FIG. 6 is a diagrammatic view illustrating an arrangement of sheets in a fourth form of apparatus.

Referring now to FIG. 1, a single sheet 100 of uniformly conducting material insulated from ground and when provided with strip electrodes 11, 12 equally spaced along their length from each other by the distance A and connected to the terminals of a battery 13, may serve for the $x$ coordinate information source. Accordingly, the potential at a point P $(x,y)$ is proportional to $x$ and is independent of $y$ since equipotential lines extend across the sheet for any given $x$ value. The potential, therefore, at the point P $(x,y)$ is $$Vo + \frac{x}{a} Va$$

and the potential difference $Vxy - Vo$ is $$\frac{x}{a} Va$$

If, therefore, the sheet is suitably grounded at P and has a conductor 18 extending from electrode 11 to an information-indicating unit, a signal proportional to the potential difference $$\frac{x}{a} Va$$

will be impressed on that unit and may be usefully employed. When the ground is later removed, the sheet, moreover, is again restored to its normally insulated condition.

Also if a second similar sheet 14 (FIG. 2) is disposed orthogonally with respect to and insulated from the sheet 10 and ground, and having battery 15 connected to its electrodes 16, 17, its potential at point P $(x,y)$ will be proportional to $y$ and will be independent of $x$ since it likewise has equipotential lines for any given $y$ value. As will be noted, the two sheets 10 and 14 may be described as floating with respect to ground and to each other. As a result when a grounded probe touches each sheet at point P, sheet 10 will be grounded at $x$ and sheet 14 will be grounded at $y$ causing a signal $Sx$ to be impressed between conductor 18 and ground, and a separate signal $Sy$ to be impressed between conductor 19 and ground. These respective signals, moreover, are proportional to the coordinate $x$ and to the coordinate $y$ as represented by the single point P.

Passing now to FIG. 3, one simple form of structure in which the invention may be embodied includes a box-like housing 20 having a flat upper surface on which the pack of sheets may be spread and with any suitable means (not shown) for detachably holding the juxtaposed sheets in proper position. Conveniently, the batteries may be housed within the structure and the upper surface of the assembly is unobstructed in order to permit easy manipulation of the probe 21 which in the form here illustrated is connected to ground by an elongated extensible conductor 22.

Such an assembly includes a sheet 22 of electrical insulating material resting on the upper surface of the housing and supporting thereabove one of the sheets of conductive material, here illustrated as the sheet 14 for the $y$ coordinates and having its equipotential lines indicated by dotted lines. Resting on the upper surface of sheet 14 is a second sheet 23 of insulating material and resting on this second sheet is the sheet 10 of conducting material providing the $x$ coordinates and also having its equipotential lines indicated by dotted lines. As will be understood, these sheets themselves have no physical indication of such equipotential lines and reference is made thereto only in the interest of understanding the invention. Finally, resting upon the sheet 10 and with its respective edge scales (indicated by 1 to 9) suitably positioned with respect to the equipotential lines of sheets 10 and 14 is a chart 24 having data such as indicated by the curve 25 which is to provide the information to be sensed and employed by an information-indicating unit.

The sheets 10 and 14 may comprise, for example, conducting paper Type L resistance 1,500–2,000 ohms per square, Catalogue No. P–24 available from Sunshine Scientific Instrument Co., Philadelphia, Pa., and the strip electrodes may comprise conducting paint applied to the opposite edges of the sheet with the respective conductors 18, 19 and with the respective leads to the battery terminals being bonded in such paint. Alternately, copper or other conducting bars connected to such conductors and leads may be physically clamped to the sheets, if so desired.

With the assembly prepared as above described and with the electrodes energized by the batteries and with the conductors 18, 19 attached to the information-indicating unit, the user then moves the grounded conducting probe 21 to point P and pushes the same into the sheets 10 and 14 whereupon the signals $Sx$ and $Sy$ are then available as direct current potentials measured from the common ground. Probe 21 preferably is a metallic needle which forms a small hole (about 3 mils in diameter) in the sheets and with a commensurate small amount of damage to the punctured sheets, and with the result that a given conductive sheet may be used with as many as 50 or more charts 24 before being replaced.

As will be appreciated, in certain modifications the probe itself need not be grounded nor indeed cause puncturing of the sheets. As indicated in FIG. 4, for example, the assembly of sheets may include a grounded metallic sheet 30 such as aluminum foil, disposed beneath the lower sheet 22 of insulating material and connected by conductor 31 to the information-indicating unit 32. In this arrangement the probe 33 may merely comprise a conductive puncturing member mounted on a handle and which when it touches the grounded sheet 30 will thereupon cause the signals $Sx$ and $Sy$ to be applied to the unit 32 due to the simultaneous grounding of sheets 10 and 14 at the point P $(x,y)$.

As shown in FIG. 5, the principle of the invention may be employed with a structure different from that shown in FIG. 1 and in which one of the sheets, for example sheet 10, is supported on the underside of an insulator block 40 and the other conductive sheet 14 is supported on the upper facing side of another insulator block 41. These blocks are spaced from each other at a sufficient distance to accommodate movement of a follower member 42 which is suitably grounded as by conductor 43. Attached to the member 42 is a pair of grounded contacts 44, 45 adapted to engage the respective sheets 10 and 14 without puncturing the same. Also attached to member 42 is a bracket 46 serving as a handle and having an indicator element 47 adapted to be positioned at the point P $(x,y)$ over the chart 24 which contains the information to be transposed and which is mounted upon the outer surface of the block 40. As will be noted, as the indicator element 47 is moved to a spot on chart 24 corresponding to point P $(x,y)$ the contacts 44, 45 follow this movement and since they are grounded the requisite signals $Sx$ and $Sy$ are applied to the unit 32 as above described with respect to the embodiments of FIGS. 3 and 4.

Passing now to FIG. 6, the invention is especially well suited for replotting purposes and often the use of independent $x$ and $y$ gains in the signals $Sx$ and $Sy$ are desired. Moreover, when the information-indicating unit is represented by equipment requiring a "seek" and an "enable" signal, such as the well known Moseley recorder, the present invention may be employed by simply adding conventional potentiometers and two additional normally ungrounded sheets of electrical conductors such as aluminum foil insulated from each other. In this modification the lowermost sheet 50 of metal is separated from an upper sheet 51 of metal by the insulating sheet 52. The stack consisting of $x$ coordinate sheet 10, insulating sheet 23, $y$ coordinate sheet 14, and insulating sheet 22 as above described with respect to FIG. 3 is disposed above the upper metal sheet 51. A first potentiometer having a pair of resistances 53, 54 is connected in parallel with battery 13 across the electrodes 11, 12 of the $x$ coordinate sheet 10 and similarly a second potentiometer having a pair of resistances 55, 56 is connected in parallel with battery 15 across the electrodes 17, 18 of the $y$ coordinate sheet 14. As an example, the batteries may provide a potential difference of 12.0 volts across their terminals when their switches 57 and 58 are closed and each of the potentiometer resistances may be about 1,500 ohms.

Connected to the information-indicating unit 62, which may be the conventional Moseley X-Y plotter, are conductors 59 and 60 respectively extending from sheets 51 and 50 and applying the "seek" and the "enable" signals to the plotter. Accordingly, when the grounded probe 21 is positioned above the desired point on a strip chart (not shown) disposed above sheet 10 and corresponding to point P $(x,y)$ and is then moved downwardly into contact with sheet 50 the following events occur.

As the probe passes through the strip chart (not shown) into sheet 10 a signal corresponding to the X coordinate of point P is applied through conductor 18 to the plotter. Then as the probe passes through sheet 14 a signal corresponding to the $y$ coordinate of the point P is applied through conductor 19 to another terminal of the plotter. Internal $x$ and $y$ gains internal to that plotter permit independent rescaling of $x$ and $y$ coordinates.

By means of the simple circuits shown in FIG. 6 and by suitable adjustment of the sliding contacts of the potentiometers the operator may establish an arbitrary "zero" on the strip chart to appear at a desired "zero" location on the replotted function. Furthermore, the required "seek" and "enable" commands are applied through the conductors 59 and 60 respectively to the plotter. Thus, the apparatus can easily provide for rescaling of either the $x$ or the $y$ values; can make arbitrary selection of origin of such values; and lends itself to making automatic plot commands to the plotter unit.

As will be understood, the invention is not limited to use with data replotters and the term "information-indicating unit" as used herein is intended to comprehend other forms of conventional apparatus. For example, simple digital voltmeters may be employed for detecting the $Sx$ and $Sy$ signals from the assembly of sheets; or such signals may be transmitted to and stored on tape; or such signals may be transferred directly into computers. In addition, the term "probe" as used herein is not limited to a member consciously moved by the operator, but may in fact be a random signal—initiating means as for example a projectile piercing the sheets; a random moving particle or object touching the sheets to generate signals; or other grounded or non-grounded object capable of causing the two $Sx$ and $Sy$ signals to be generated.

Having thus described preferred forms of coordinated apparatus by means of which the invention is practiced, it will be understood that the invention may be embodied in other forms without departing from the scope of the invention as defined by the appended claims.

What is claimed is:

1. An electrical sensor of plane coordinates comprising first and second sheets of conductive material spaced from each other and having a uniform resistivity throughout, insulating means separating said sheets, each of said sheets having attached thereto a pair of electrodes equally spaced from each other across the sheet, said sheets being juxtaposed to provide an indeterminate number of sets of plane coordinates in the form of equipotential lines normal to each other across the respective sheets of conductive material first and second electrical circuits including the respective conductive sheets floating with respect to each other and with respect to ground, a pair of conductors extending respectively from one of the electrodes of each conductive sheet and adapted to carry a signal at a potential representative of a selected point on the sheet to which it is attached, and movable probe means for touching each of said sheets at said selected point in order to generate said signals and without altering the spacing between said conductive sheets.

2. A sensor as defined in claim 1 wherein said insulating means comprises a sheet of insulating material.

3. A sensor as defined in claim 1 wherein said electrical circuits include batteries floating with respect to each other and with respect to ground.

4. A sensor as defined in claim 1 wherein said probe means comprises a conductive grounded member adapted to puncture said sheets at the selected point thereon.

5. A sensor as defined in claim 1 wherein said probe means comprises a conductive grounded member adapted to touch said sheets at the selected point thereon without puncturing the sheets.

6. An electrical sensor of plane coordinates comprising, first and second sheets of conductive material spaced from each other and having a uniform resistivity throughout, each of said first and second conductive sheets having attached thereto a pair of electrodes equally spaced from each other across the sheet, a first sheet of insulating material separating said first and second sheets of conductive material, said first and second sheets of conductive material being juxtaposed to provide an indeterminate number of sets of plane coordinates in the form of equipotential lines normal to each other across the respective sheets of conductive material, first and second electrical circuits including said conductive sheets and floating with respect to each other and with respect to ground, a pair of conductors extending respectively from one of the electrodes of each conductive sheet and adapted to carry a signal at a potential representative of a selected point on the sheet to which it is attached, a grounded sheet of conductive material, a conductor extending from said grounded sheet and adapted to establish circuits through said pair of electrode-connected conductors, a second sheet of insulating material separating said grounded sheet and said second sheet of conductive material, and movable probe means for touching each of said sheets at the selected point corresponding to the desired coordinates of said first and second conductive sheets and thereby generating separate signals in each of said pair of conductors and without altering the spacing between said first and second sheets.

7. Apparatus as defined in claim 6 wherein said probe means comprises a conductive element adapted to puncture the first and second conductive sheets and to become grounded only upon touching said grounded sheet.

8. An electrical sensor of plane coordinates comprising first and second sheets of conductive material having a uniform resistivity throughout, each of said first and second conductive sheets having attached thereto a pair of electrodes equally spaced from each other across the sheet, a first sheet of insulating material separating said first and second sheets of conductive material, said first and second sheets of conductive material being juxtaposed to provide an indeterminate number of sets of plane coordinates in the form of equipotential lines normal to each other across the respective sheet surfaces, first and second electrical circuits including said conductive sheets and floating with respective to each other and with respect to ground, a pair of conductors extending respectively from one of the electrodes of each conductive sheet and adapted to carry a signal at a potential representative of a selected point on the sheet to which it is attached, third and fourth sheets of conductive material insulated from each other and with the third sheet being insulated from said second conductive sheet, third and fourth conductors extending respectively from said third and fourth conductive sheets and adapted to carry signals upon the grounding of said third and fourth sheets, and a movable grounded probe means for touching each of said sheets of conductive material at the selected point corresponding to the desired coordinates of said first and second conductive sheets thereby to generate separate signals in each of said conductors.

9. Apparatus as defined in claim 8 wherein said first and said second electrical circuits include potentiometers adapted to modify the signals carried in the respective first and second circuits.

10. Apparatus as defined in claim 8 wherein said third conductor is adapted to carry a "seek" signal for a plotter mechanism.

11. Apparatus as defined in claim 8 wherein said fourth conductor is adapted to carry an "enable" signal for a plotter mechanism.

12. For use in the electrical sensing of plane coordinates, a sheet of conductive material having a uniform resistivity throughout, a pair of electrodes attached to the sheet and equally spaced from each other to provide equipotential lines extending across the sheet, a conductor attached to one of said electrodes and floating with respect to ground for applying a potential across said sheet, and electrically conductive means for puncturing said sheet at a selected point on its surface thereby to effect the application of an electrical signal through said conductor attached to said one electrode and at a potential representative of the plane coordinate of said selected point on said sheet.

13. Apparatus as defined in claim 12 wherein said means for applying a potential across said sheet comprises a battery.

* * * * *